United States Patent
Lee et al.

(10) Patent No.: US 7,501,776 B2
(45) Date of Patent: Mar. 10, 2009

(54) APPARATUS FOR CONTROLLING HIGH SPEED OPERATION OF MOTOR AND METHOD THEREOF

(75) Inventors: Gil-Su Lee, Gyeonggi-Do (KR); Kyung-Hoon Lee, Seoul (KR); Dal-Ho Cheong, Seoul (KR)

(73) Assignee: LG Electronics Inc., Seoul (KR)

( * ) Notice: Subject to any disclaimer, the term of this patent is extended or adjusted under 35 U.S.C. 154(b) by 128 days.

(21) Appl. No.: 11/738,575

(22) Filed: Apr. 23, 2007

(65) Prior Publication Data
US 2007/0257626 A1 Nov. 8, 2007

(30) Foreign Application Priority Data
May 3, 2006 (KR) ................ 10-2006-0040188

(51) Int. Cl.
*H02P 7/00* (2006.01)
(52) U.S. Cl. .................. 318/268; 318/721; 318/400.02
(58) Field of Classification Search ................ 318/268, 318/400.02, 400.14, 715, 717, 721
See application file for complete search history.

(56) References Cited

U.S. PATENT DOCUMENTS

| | | | | |
|---|---|---|---|---|
| 5,585,709 | A * | 12/1996 | Jansen et al. | 318/807 |
| 6,639,380 | B2 * | 10/2003 | Sul et al. | 318/727 |
| 6,646,409 | B2 * | 11/2003 | Won et al. | 318/701 |
| 6,822,417 | B2 * | 11/2004 | Kawaji et al. | 318/701 |
| 6,831,439 | B2 * | 12/2004 | Won et al. | 318/701 |
| 7,045,988 | B2 * | 5/2006 | Ha et al. | 318/807 |
| 7,132,816 | B1 * | 11/2006 | Markunas et al. | 318/400.02 |
| 7,271,562 | B2 * | 9/2007 | Lee et al. | 318/609 |
| 2002/0041171 | A1 | 4/2002 | Cho | |
| 2003/0015987 | A1 | 1/2003 | Cheong et al. | |
| 2004/0061472 | A1 | 4/2004 | Won et al. | |
| 2004/0174083 | A1 | 9/2004 | Han et al. | |
| 2005/0057111 | A1 | 3/2005 | Han et al. | |
| 2006/0284512 | A1 | 12/2006 | Lee et al. | |

FOREIGN PATENT DOCUMENTS

EP 1492224 12/2004

OTHER PUBLICATIONS

U.S. Appl. No. 11/738,588 to Shin et al., which was filed Apr. 23, 2007.

* cited by examiner

*Primary Examiner*—Bentsu Ro
*Assistant Examiner*—Thai Dinh
(74) *Attorney, Agent, or Firm*—Greenblum & Bernstein, P.L.C.

(57) ABSTRACT

An apparatus and method for controlling high speed operation of a motor for controlling high speed operation of a motor by estimating the position and the speed of the rotor of a synchronous motor without a PI regulator to eliminate the users' inconvenience and to secure the reliability of the control of a rotor's position and speed of a synchronous motor, which includes: a reference frame transformer that receives triangular coordinate voltages and currents and converts them to static coordinate voltages and currents, a flux observer that receives the converted static coordinate voltages and currents and observes and outputs the flux of the stator, a position estimator that receives the converted static coordinate currents and the observed flux of the stator and estimates and outputs the position of the rotor, and a speed estimator that receives the estimated position of the rotor and estimates and outputs the speed of the rotor.

9 Claims, 4 Drawing Sheets

APPARATUS FOR CONTROLLING HIGH SPEED OPERATION OF MOTOR AND METHOD THEREOF

RELATED APPLICATION

The present disclosure relates to subject matter contained in priority Korean Application No. 10-2006-0040188, filed on May 3, 2006, which is herein expressly incorporated by reference in its entirety

BACKGROUND OF THE INVENTION

1. Field of the Invention

The present invention relates to an apparatus for controlling high speed operation of a motor and a method thereof and, more particularly, to an apparatus for controlling high speed operation of a motor and a method thereof by estimating the position and the speed of the rotor of a synchronous motor without a PI(Proportional plus Integral) regulator to eliminate the users' inconvenience due to gain adjustment of the PI regulator and additionally to secure the reliability of the control of speed and position of a rotor of a synchronous motor.

2. Description of the Conventional Art

In general, the position and the speed of the rotor should be estimated for sensor-less vector control of a permanent magnet synchronous motor (PMSM). The position of the rotor is necessary for reference frame transform, and the speed of the rotor is necessary for speed control.

To estimate the speed and position of the rotor, the position of a rotor and a speed estimator according to a conventional art is composed of a reference frame transformer 110 that converts static coordinate system voltages and currents to synchronous coordinate system voltages and currents; an EEMF (Extended Electromotive Force) estimator 120 that receives inputs from the coordinate-converted voltages and currents and calculates position error; a PI regulator 131 that estimates the speed of the rotor using the position error calculated by the above estimator; and an integrator 132 that estimates the position of the rotor by integrating the estimated speed of the rotor.

In the conventional art, after estimating EEMF that provides error information ($\hat{e}_{r\_error}$) between the actual position of the rotor ($\theta_r$) and the estimated position of the rotor ($\hat{\theta}_r$) using static coordinate currents ($i_{\alpha\beta}$) and voltages ($v_{\alpha\beta}$), the position ($\theta_r$) and speed ($\omega_r$) of the rotor that are necessary for vector control are estimated using PLL (Phase Locked Loop), so that the estimated EEMF (Extended Electromotive Force, $\hat{e}_q$) converges to 0.

FIG. 1 shows an apparatus for controlling high speed operation of a sensor-less PMSM that includes a conventional PI regulator, the PLL is composed a PI regulator and an integrator, and the output of the PI regulator 131 is the estimated speed of the rotor ($\hat{\omega}_r$) and the output of the integrator is the estimated position of the rotor ($\hat{\theta}_r$).

In a conventional art that uses PLL, the estimated performance of the rotor's position and speed depends heavily on the PI regulator's gain since the position and the speed of the rotor are estimated by the PI regulator 131. In other words, if the bandwidth of the PI regulator 131 is too small, in high speed operation the estimated position of the rotor could step out of the actual position.

FIG. 2 is a graph illustrating the magnetic model of PMSM of a conventional art with saliency. If the position and the speed are estimated by the motor parameters of constants in a PMSM with saliency, the occurred motor parameter errors deviate from regular operating points and, finally, the estimation of the position and the speed results in error. To tackle the issue, the magnetic model should be embodied for high accuracy speed control. To implement it according to the conventional art, all the specific points shown in FIG. 2 have to be stored in a memory and the value of the current operating point should be interpolated.

However, the method requires a large amount of data and interpolation calculation, and the implementation thereof is limited by memory and processing power.

Therefore, in the convention art, an additional work to adjust PI gain is necessary, and a difficulty exists because it should be adjusted through many tests.

SUMMARY OF THE INVENTION

The present invention has been finalized in view of the drawbacks of the conventional art. Therefore, an object of the present invention is to provide an apparatus for controlling high speed operation of a motor that does not use a PI regulator and that therefore does not need to adjust regulation parameters through repeated tests, and a method thereof.

Another object of the present invention is to provide a uniform position and speed estimate performance of a rotor of a motor throughout the whole operation range of a motor from low speed to high speed regardless of the PI regulator's gain adjustment, without using the PI regulator.

To achieve these and other advantages and in accordance with the purpose of the present invention, as embodied and broadly described herein, there is a provided an apparatus for controlling high speed operation which includes: a reference frame transformer that receives triangular coordinate voltages and currents and converts them to static coordinate voltages and currents from; a flux observer that receives the converted static coordinate voltages and currents and observes and outputs the flux of the stator; a position estimator that receives the converted static coordinate currents and the observed flux of the stator and estimates and outputs the position of the rotor; and a speed estimator that receives the estimated position of the rotor and estimates and outputs the speed of the rotor.

To achieve these and other advantages and in accordance with the purpose of the present invention, as embodied and broadly described herein, there is a method of controlling high speed operation of a motor which includes: a process of receiving triangular coordinate currents and voltages and converting them to static coordinate currents and voltages; a process of receiving the converted static coordinate currents and voltages and observing and outputting the flux of the stator; a process of receiving the detected currents of the stator and the observed flux of the stator and estimating and outputting the position of the rotor; and a process of receiving the estimated position of the rotor and estimating and outputting the speed of the rotor speed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a detailed description will be given with reference to FIGS. 3 to 5 regarding a preferred embodiment of an apparatus for controlling a motor which does not use a PI regulator and thus does not require controller parameters to be adjusted through repeated tests, and provides a uniform position and speed estimate performance of a rotor of a motor throughout the whole operation range of operation of the motor from low speed to high speed regardless of the PI regulator's gain adjustment, and a method thereof.

Figure 3:
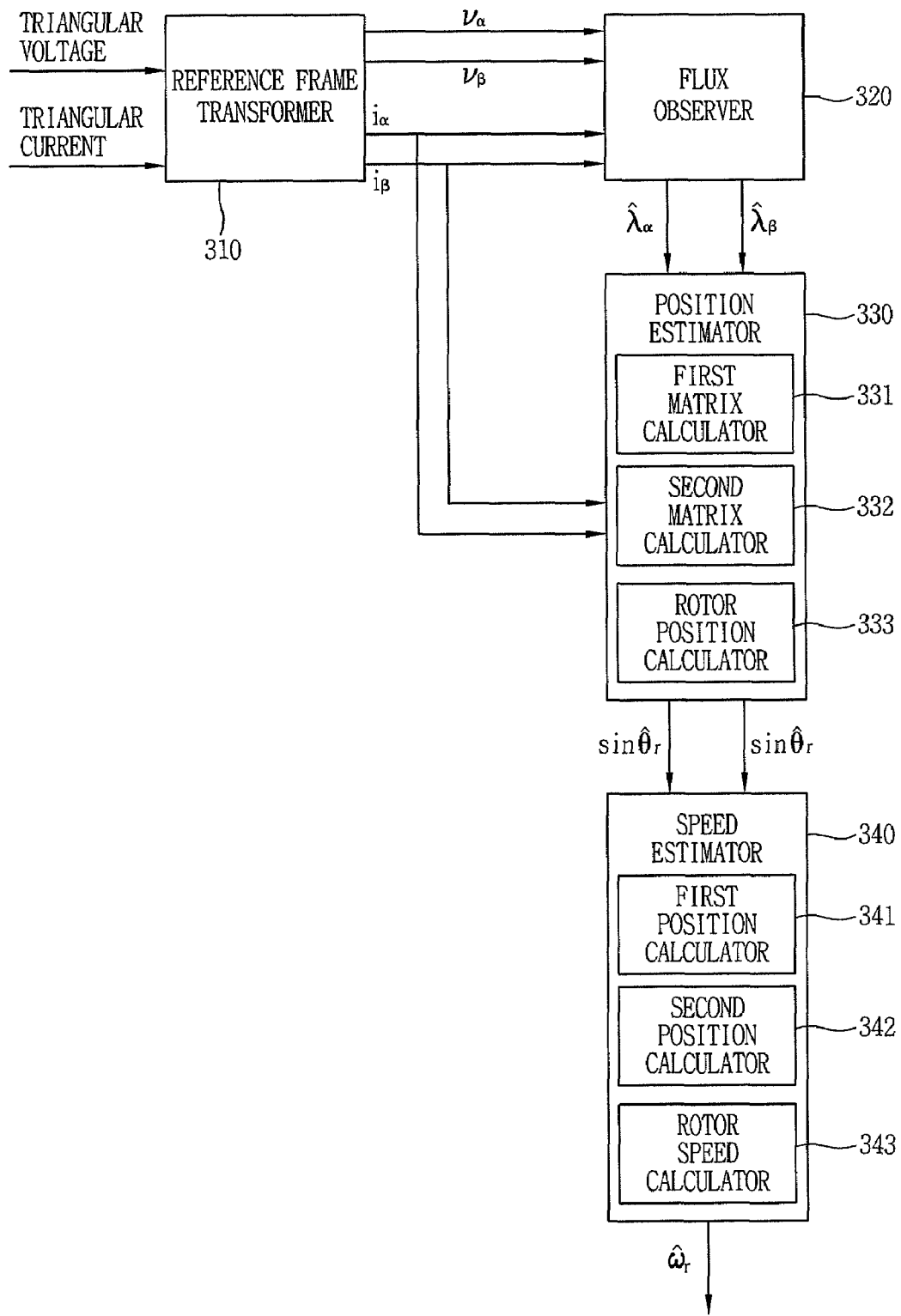
FIG. 3 is a block diagram illustrating an apparatus for controlling high speed operation of a sensor-less PMSM without a PI controller according to the present invention.
Figure 4:
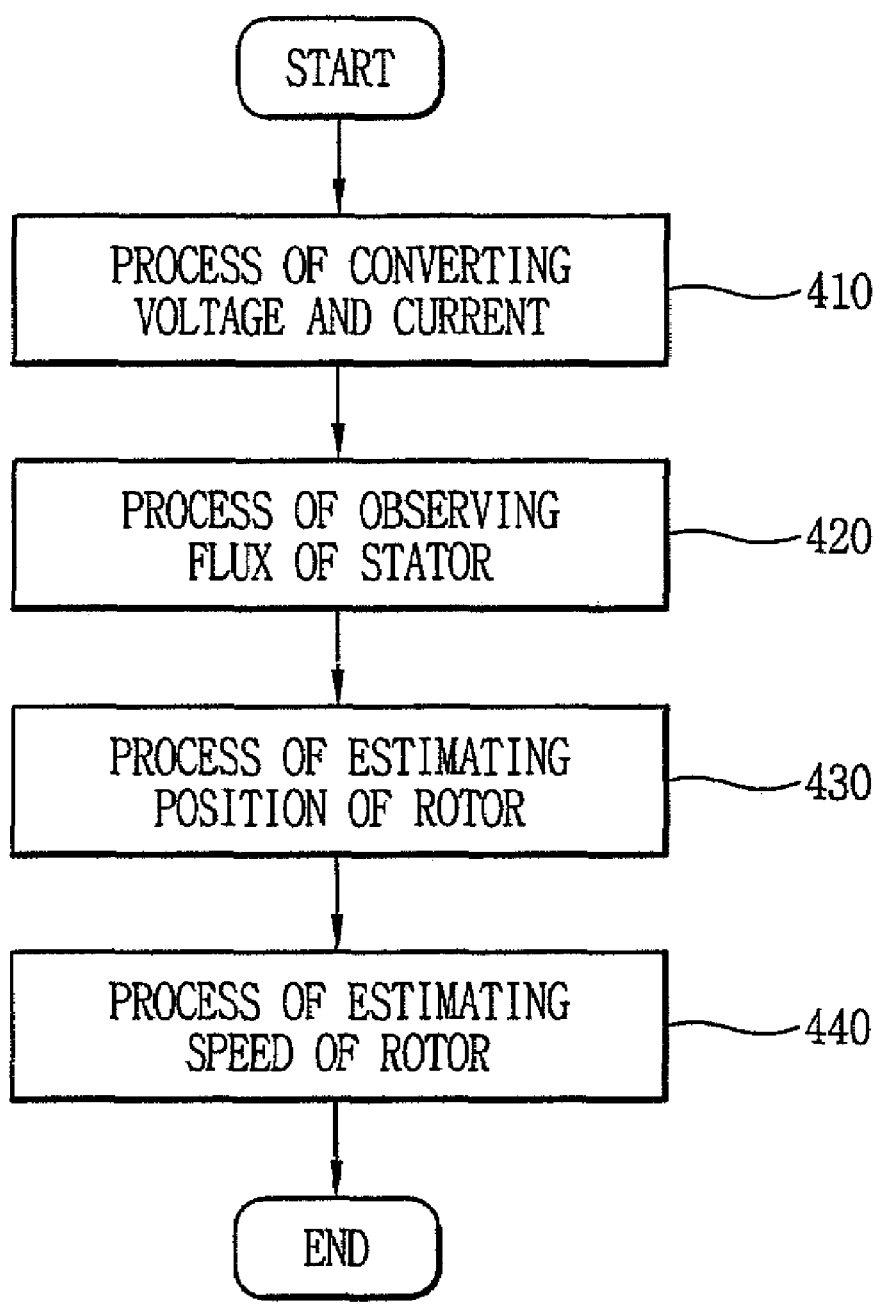
FIG. 4 is a logic diagram that illustrates a method of controlling high speed operation of a sensor-less PMSM according to the present invention.

As shown in FIG. 3, the apparatus for controlling high speed operation of a motor according to the embodiment of the present invention includes a reference frame transformer 310 that receives triangular coordinate voltages and currents and convert them to static coordinate stator voltages and currents; a flux observer 320 that receives the converted static coordinate currents and voltages and observers and outputs the flux of the stator; a position estimator 330 that receives the detected current of the rotor and the observed flux of the rotor and estimates and outputs the position of the rotor; and a speed estimator 340 that that receives the estimated position of the rotor and estimates and outputs the speed of the rotor.

The flux observer 320 observes the flux of the stator using an equation of state composed of the differential value of the observed flux of the stator, the measured voltage of the stator, the multiplication of the negative phase resistance value and the above detected current of the stator, and the multiplication of negative cut-off frequency and the observed flux.

In other words, an embodiment of the flux observer 320 is embodied by Formula 1 shown below.

$$\frac{d}{dt}\begin{bmatrix}\hat{\lambda}_\alpha\\\hat{\lambda}_\beta\end{bmatrix}=\begin{bmatrix}v_\alpha\\v_\beta\end{bmatrix}-R_s\begin{bmatrix}i_\alpha\\i_\beta\end{bmatrix}-g\begin{bmatrix}\hat{\lambda}_\alpha\\\hat{\lambda}_\beta\end{bmatrix} \quad (1)$$

The position estimator 330 includes: a first matrix calculator 331 that calculates a 4 row and 4 column matrix composed of the multiplication of the value obtained by subtracting L axis inductance from D axis inductance and D axis instruction current, the stator flux, and the negative stator flux; a second matrix calculator 332 that calculates a 2 row and 2 column matrix composed of the above estimated stator flux and the multiplication of the negative L axis inductance and the detected stator current; and a rotator position calculator 333 that calculates the sine and cosine values of the position of the rotor by dividing a middle matrix obtained by the multiplication of the calculated first and second matrix by the middle matrix value.

In other words, the embodiment of the position estimator 330 is embodied by Formula 2 shown below.

$$\begin{bmatrix}\cos\hat{\theta}_r\\\sin\hat{\theta}_r\end{bmatrix}=\frac{1}{\{(L_d-L_q)i_{dref}\}^2+\lambda_{PM}^2}\begin{bmatrix}(L_d-L_q)i_{dref} & -\lambda_{PM}\\\lambda_{PM} & (L_d-L_q)i_{dref}\end{bmatrix} \quad (2)$$

$$\left(\begin{bmatrix}\hat{\lambda}_\alpha\\\hat{\lambda}_\beta\end{bmatrix}-L_q\begin{bmatrix}i_\alpha\\i_\beta\end{bmatrix}\right)$$

The speed calculator 340 includes a first position calculator 341 that calculates the multiplication of the current step sine value and the prior step cosine value of the estimated rotor position; a second position calculator 342 that calculates the multiplication of the current step cosine value and the prior step sine value of the estimated rotor position; and a rotor speed calculator 343 that subtracts the second position value from the first position value and divides the result by a sampling period to calculate the speed of the rotor.

In other words, the embodiment of the speed calculator 340 is embodied by Formula 3 shown below.

$$\hat{\omega}_r=\frac{\sin\hat{\theta}_r(n)\cos\hat{\theta}_r(n-1)-\cos\hat{\theta}_r(n)\sin\hat{\theta}_r(n-1)}{T_s} \quad (3)$$

여기서, $\sin\hat{\theta}_r(n-1)=\sin\hat{\theta}_r(n)$, $\cos\hat{\theta}_r(n-1)=\cos\hat{\theta}_r(n)$ As shown in FIG. 3, the method of controlling high speed operation of a synchronous motor according to the embodiment of the present invention includes: a process 410 of receiving the triangular coordinate currents and voltages and converting them to the static coordinate currents and voltages; a process 420 of receiving the converted static coordinate currents and voltages and observing and outputting the flux of the stator; a process 430 of receiving the detected currents of the stator and the observed flux of the stator and estimating and outputting the position of the rotor; and a process 440 of receiving the estimated position of the rotor and estimating and outputting the speed of the rotor speed.

The process 420 of observing the flux includes a step of observing the flux of the stator using an equation of state composed of the differential value of the observed flux of the stator, the measured voltage of the stator, the multiplication of the negative phase resistance value and the detected stator current value, and the multiplication of the negative cut-off frequency and the observed flux.

The process 430 of estimating the position includes: a step of calculating the first 4 row and 4 column matrix that is composed of the multiplication of the value obtained by subtracting L axis inductance from D axis inductance and D axis instruction current, the flux of the stator, and the negative stator flux; a step of calculating the second 2 row and 2 column matrix composed of the estimated flux of the stator and the multiplication of the negative L axis inductance and the detected stator current; and a step of calculating the sine and cosine value of the position of the rotor by dividing the middle matrix obtained by the multiplication of the calculated first and second matrix by the middle matrix value.

The process of estimating speed 440 includes: a step of calculating the first position by multiplying of the sine value of the current position of the stator and the cosine value of the prior position; a step of calculating the second position by multiplying the cosine value of the current position of the stator and the sine value of the prior position; and a step of calculating the speed of the rotor by subtracting the calculated second position value from the calculated first position value and diving the subtraction result by the sampling period.

Though the method of controlling high speed operation of a synchronous motor according to the embodiment of the present invention uses the same information as the motor's current, voltage and parameters that are required in a conventional art, the present invention calculates the position directly from the static coordinate system model of the synchronous motor to avoid using the PI regulator.

The suggested present invention enables real time calculation of the position of the rotor without the PI regulator, using the motor parameter that has been input already, D axis instruction current, the flux of static coordinate system, and the measured current.

Since the motor parameters, D axis instruction current, and the measured current are known already, the flux of the stator and the flux of the synchronous coordinate system can be easily estimated by applying a generally used flux observer.

During the process of estimating the flux of the stator, the cut-off frequency g is a control parameter to eliminate DC offset and can be easily defined by analyzing frequency since it means the cut-off frequency of a high-pass filter. Since current and voltage information is being measured, the flux in static coordinate system can be calculated from them.

In summary, the position of a rotor can be estimated without an additional PI regulator and the speed of the rotor can be estimated easily from the position of the rotor by calculating and applying the synchronous coordinate system flux value.

Figure 5:
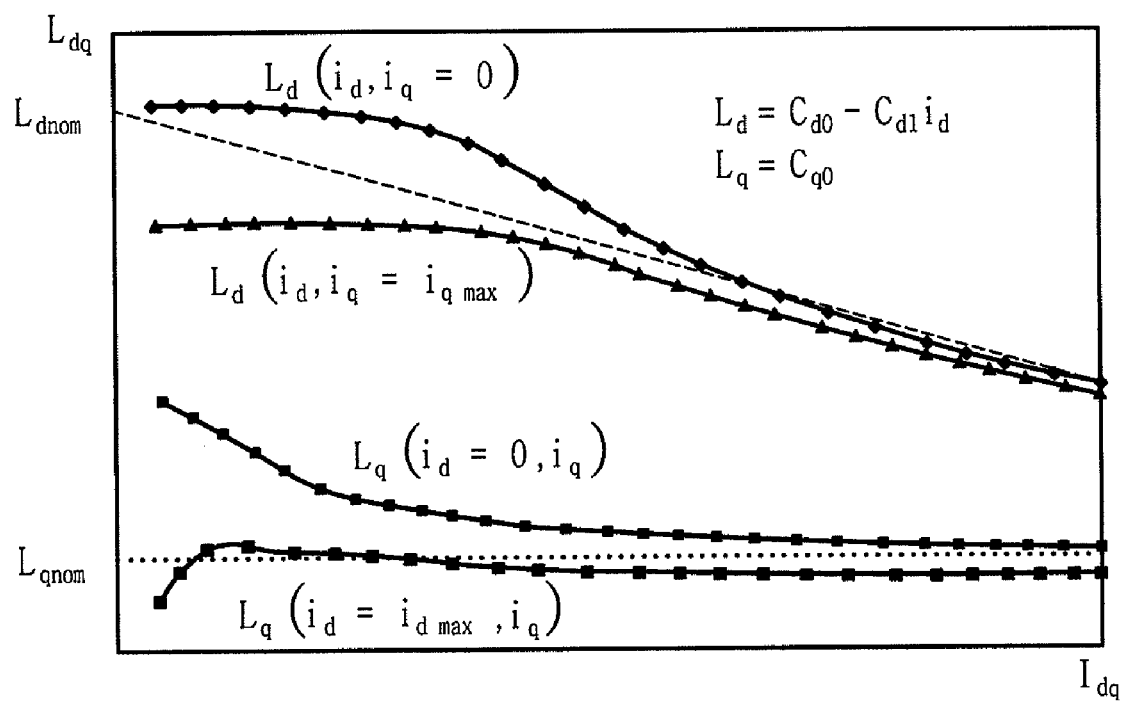
FIG. 5 is a result graph that traces the position and the speed when a high speed operation of the sensor-less PMSM according to the present invention is controlled.

As shown in FIG. 5, the method for controlling high speed operation of a motor according to the embodiment of the present invention is the result of tracing positions by linear approximation of magnetic model, and FIG. 5 shows that motor parameters can be calculated in real time through only the operation points and 3 elements even though Q axis inductance is ignore since it saturates lower than D axis inductance.

Figure 1:
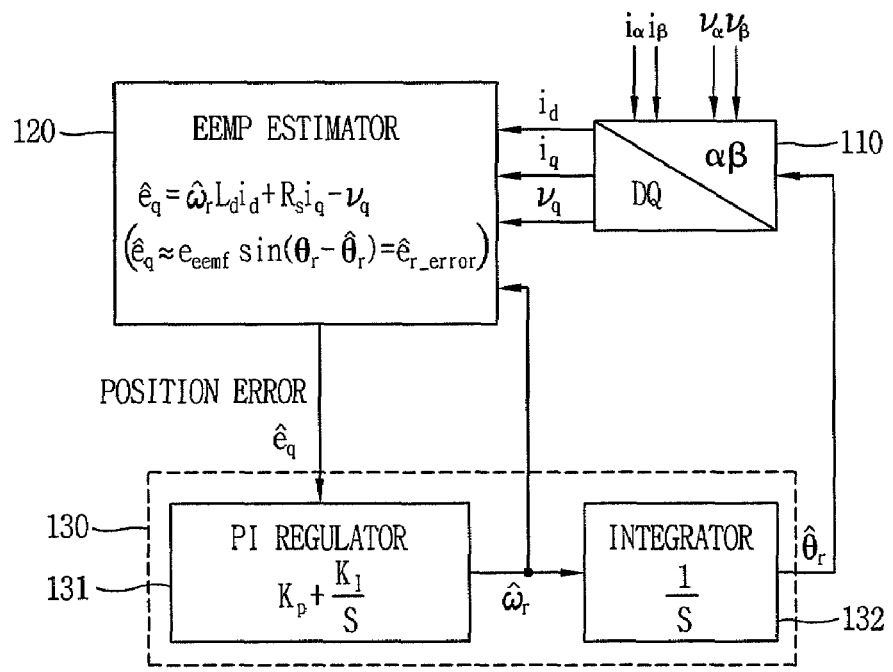
FIG. 1 is a circuit diagram of an apparatus for controlling high speed operation of a sensor-less PMSM that uses a PI controller according to a conventional art.
Figure 2:
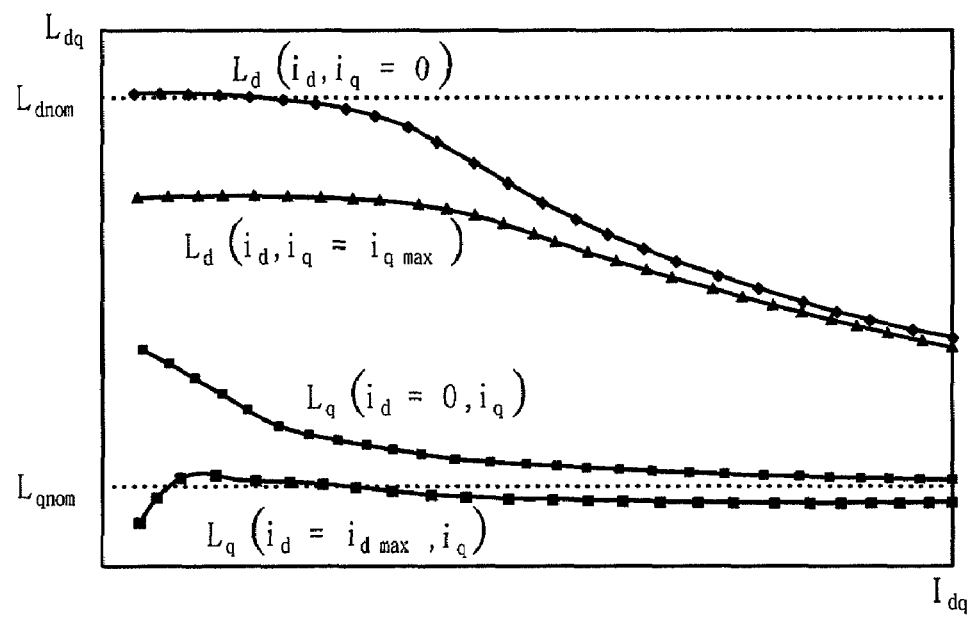
FIG. 2 is a result graph that traces the position and the speed when high speed operation of a sensor-less PMSM is controlled using a PI controller according to the conventional art.

This also shows little difference from the traced result based on the conventional art that uses the PI regulator which is shown in FIG. 2.

Although the preferred embodiment of the present invention has been described, the present invention is not limited to the embodiment but may be modified in many different forms within the scope defined by the appended claims.

What is claimed is:

1. An apparatus for controlling high speed operation comprising:
    a reference frame transformer that receives triangular coordinate voltages and currents and converts them to static coordinate voltages and currents;
    a flux observer that receives the converted static coordinate voltages and currents and observes and outputs the flux of the stator;
    a position estimator that receives the converted static coordinate currents and the observed flux of the stator and estimates and outputs the position of the rotor; and
    a speed estimator that receives the estimated position of the rotor and estimates and outputs the speed of the rotor.

2. The apparatus of claim 1, wherein the flux observer observes the flux of the stator using an equation of state composed of the measure stator voltage, the multiplication of a phase resistance value and the detected stator current value, and the multiplication of the DC offset parameter of the output flux and the measure flux.

3. The apparatus of claim 2, wherein the DC offset parameter of the output flux is the cut-off frequency of a high pass filter.

4. The apparatus of claim 1, wherein the position estimator includes:
    a first matrix calculator that calculates a 4 row and 4 column matrix composed of the multiplication of the value obtained by subtracting L axis inductance from D axis inductance and D axis instruction current, and the stator flux;
    a second matrix calculator that calculates a 2 row and 2 column matrix composed of the stator flux and the multiplication of the L axis inductance and the detected stator current; and
    a rotator position calculator that calculates the sine and cosine values of the position of the rotor by dividing a middle matrix obtained by the multiplication of the calculated first and second matrix by the middle matrix value.

5. The apparatus of claim 1, wherein the speed estimator includes:
    a first position calculator that calculates the multiplication of the current step sine value and the prior step cosine value of the estimated rotor position;
    a second position calculator that calculates the multiplication of the current step cosine value and the prior step sine value of the estimated rotor position; and
    a rotor speed calculator that subtracts the second position value from the first position value and divides the result by a sampling period to calculate the speed of the rotor.

6. A method of controlling high speed operation of a motor comprising:
    a process of receiving triangular coordinate currents and voltages and converting them to static coordinate currents and voltages;
    a process of receiving the converted static coordinate currents and voltages and observing and outputting the flux of the stator;
    a process of receiving the detected currents of the stator and the observed flux of the stator and estimating and outputting the position of the rotor; and
    a process of receiving the estimated position of the rotor and estimating and outputting the speed of the rotor speed.

7. The method of claim 6, wherein the process of observing the flux includes a step of observing the flux of the stator using an equation of state composed of the measured voltage of the stator, the multiplication of the negative phase resistance value and the detected stator current value, and the multiplication of the cut-off frequency and the observed flux.

8. The method of claim 6, wherein the process of estimating the position includes:
    a step of calculating a first 4 row and 4 column matrix composed of the multiplication of the value obtained by subtracting L axis inductance from D axis inductance and D axis instruction current, and the flux of the stator;
    a step of calculating a second 2 row and 2 column matrix composed of the estimated flux of the stator and the multiplication of the negative L axis inductance and the detected stator current; and
    a step of calculating the sine and cosine value of the position of the rotor by dividing a middle matrix obtained by the multiplication of the calculated first and second matrix by the middle matrix value.

9. The method of claim 6, wherein the process of estimating speed includes:

a step of calculating a first position by multiplying of the sine value of the current position of the stator and the cosine value of the prior position;

a step of calculating the second position by multiplying the cosine value of the current position of the stator and the sine value of the prior position; and a step of calculating the speed of the rotor by subtracting the calculated second position value from the calculated first position value and diving the subtraction result by a sampling period.

* * * * *